Feb. 5, 1957
M. M. MARISIC ET AL
2,780,527
PRODUCTION OF GRAPHITE
Filed Jan. 25, 1955
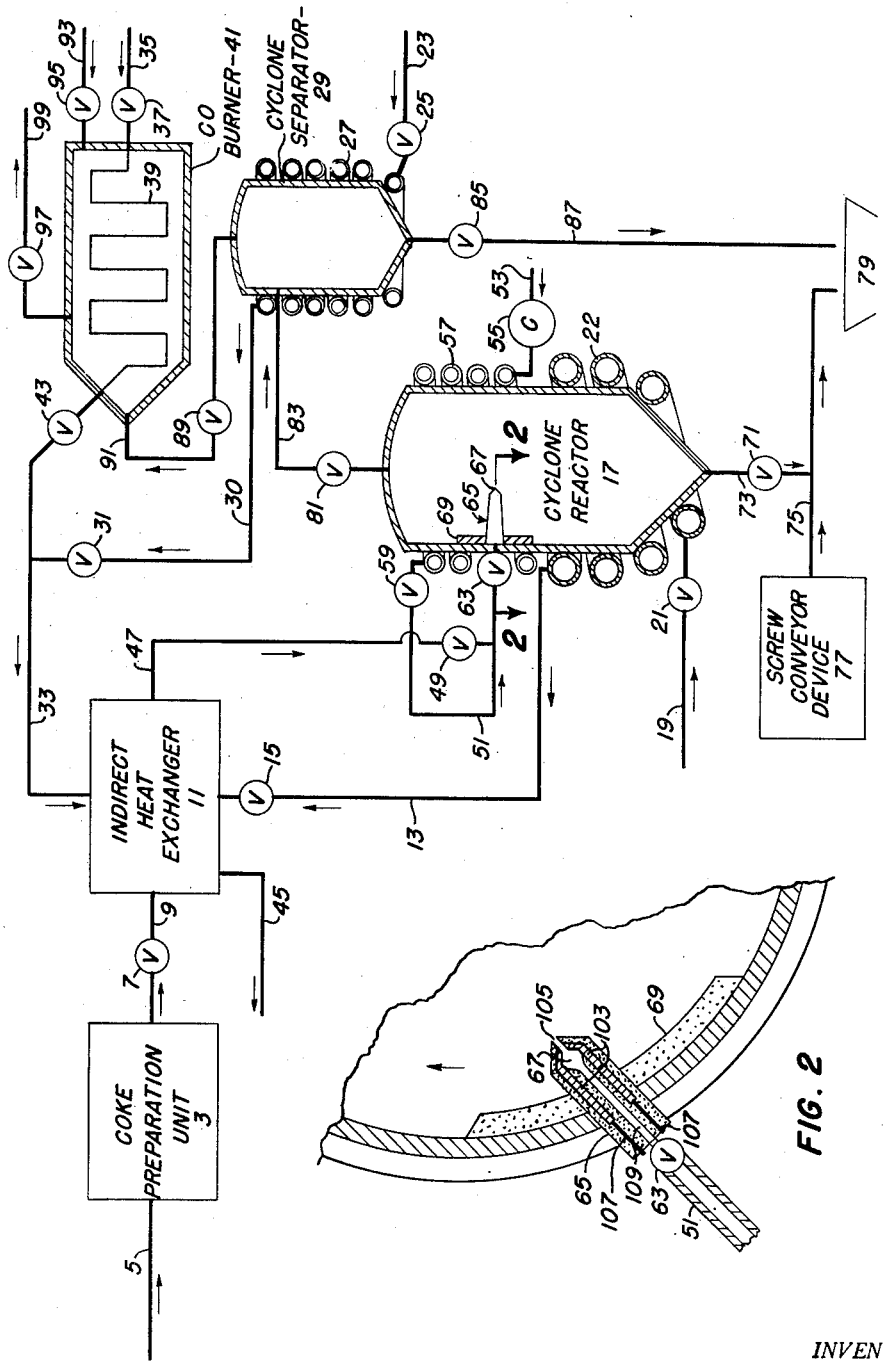
INVENTORS.
LE ROI E. HUTCHINGS
MILTON M. MARISIC
By Edward H. Ling
ATTORNEY

United States Patent Office 2,780,527
Patented Feb. 5, 1957

2,780,527

PRODUCTION OF GRAPHITE

Milton M. Marisic, Elgin, and Le Roi E. Hutchings, Crystal Lake, Ill., assignors to The Pure Oil Company, Chicago, Ill., a corporation of Ohio Application January 25, 1955, Serial No. 483,876

7 Claims. (Cl. 23—209.1)

This invention relates to a process for treating finely divided carbonaceous material to produce graphite.

More particularly, this invention relates to the production of graphite from divided amorphous forms of carbon by a fluidized-solids technique.

Graphite is a crystalline form of carbon possessing hexagonal symmetry with planes of carbon atoms in hexagonal rings. Graphite is remarkably soft. The crystal readily splits off thin flakes whose cleavage planes undoubtedly are identical with the planes of the carbon atoms of the crystal. Graphite is widely used as a pigment, as a material for high temperature crucibles and retorts, and as a basic constituent of pencil "lead." Graphite is also extensively used in the manufacture of electrodes, and has found application in various oil and water formulations as a lubricant.

A small amount of graphite is supplied from natural sources, mainly from older crystalline rocks, such as gneiss, granulite, schist and crystalline limestone. By far the largest production of graphite, however, is from the electric furnace process which converts carbon into graphite at very high temperatures. The raw material is usually petroleum coke, although anthracite coal or other sources of carbon may be used. The raw material usually contains enough carbide-forming material so that the necessary transformation from carbon to graphite may take place. In the electric arc process, the feed material may be mixed with a little tar, and sometimes sand and sawdust, and the required article molded to shape. The articles are then stacked transversely in an electric arc furnace, each being packed in granular coke. If graphite powder is desired, rather than a molded article, coke in lump or granular form is introduced without molding. The electric furnace usually has graphite block walls and electrodes at each end. A current of about 3000 amperes at 220 volts is applied to the articles and the current is gradually increased up to 9000 amperes at 20 volts after 20 hours. Carbide is first formed from the various metallic constituents in the coke, and then dissociates at about 2250° C. Usually a temperature of 3000° C. is achieved in order to obtain substantially pure graphite. Graphite may also be made in the electric furnace by the high temperature decomposition, approximately 5000–7000° F., of carborundum to silicon vapors and graphite.

Despite the production of substantially pure graphite by the electric arc process, certain disadvantages are apparent. First and foremost, the electric arc process is expensive, requiring a large initial outlay for the electric furnace and supplementary equipment. The amount of electricity required to convert the coke or anthracite to graphite is large, so that favorable geographical locations for plants producing graphite are restricted to areas near large sources of cheap electricity, usually hydroelectric power. Transportation charges to parts of the country not having indigenous graphite-producing plants increase costs. Additionally, the electric arc process is relatively slow, consuming up to 20 or more hours in an average run. Many electric arc processes also require slow heating of the furnace to about 1000° C., which adds to the processing time.

It therefore appears that a process not employing electrical resistance as the prime source of heat necessary to reach the high coke-graphite conversion temperatures would be advantageous. Heretofore, carbonaceous material has been converted to activated carbon, and other amorphous carbon forms requiring only relatively low temperatures for conversion, by the use of non-electric processes employing metallic reaction vessels. However, production of graphite in metal, particularly iron or steel, reactor vessels has not been attempted, since it is well known that the usual metals utilized for process vessels become soft and may actually melt at the very high temperatures required for the efficient conversion of carbonaceous material to graphite.

We have now discovered that graphite may be continuously and economically produced by a special fluidized-solids technique utilizing metallic reaction vessels.

Accordingly, it is an object of our invention to provide a method for the production of graphite from carbonaceous feed material.

It is another object of our invention to provide an economical and efficient means for the continuous conversion of finely divided particulate carbon to graphite.

It is yet another object of our invention to provide a fluidized-solids process for the continuous conversion of finely divided carbonaceous material in a metallic reactor to substantially pure graphite.

It is still another object of our invention to continuously convert finely divided coke in a steel reaction vessel utilizing feed as the heat source and utilizing heat produced in the process.

In general, our invention covers the conversion of carbonaceous feed to commercially utilizable graphite in a metallic reactor by a fluidized-solids technique.

More particularly, our invention comprises a process whereby graphite is produced in a steel cyclone reactor through the burning and conversion of a portion of the feed, in a refractory nozzle in the presence of substantially pure pre-heated oxygen, to CO, some $CO_2$ and $SO_2$, whereby sufficient heat to attain the high temperatures necessary for the feed-to-graphite conversion reaction is produced.

A particular point of novelty is the necessary rapid heat transfer achieved by intimate contact of charge in a finely-divided, dispersed phase with oxygen at the nozzle site. The cyclone reactor assures rapid enough dissipation of the heat of combustion after the conversion of coke to graphite is achieved at the reaction site to prevent melting of the metallic reactor vessel. Heat is reutilized to accelerate the conversion of coke to graphite.

The present invention will be best understood by reference to the accompanying drawings. Figure 1 is a schematic representation with certain elements in cross-section of apparatus in which the instant invention may be performed. Figure 2 is a fragmentary, enlarged cross-section of a cyclone reactor and attached burner taken along line 2—2 of Figure 1.

Referring to Figure 1, petroleum coke or other carbonaceous feed material, such as anthracite coal, is supplied to coke preparation unit 3 through line 5 by means of a suitable conveyor. In coke preparation unit 3 the feed undergoes suitable conditioning, which may, for example, comprise drying, grinding, pulverizing and the like, so that prepared feed is obtained in a finely divided particulate form, preferably of 100 to 300 mesh size or smaller. The finely divided feed passes out of coke preparation unit 3 by any suitable means, preferably gravity flow, through valve 7 into line 9 and thence into indirect heat exchanger 11 wherein it is heated by indirect heat exchange with combustion gases or steam to a temperature of at least 1000° F. Said indirect heat exchanger 11 may be of any conventional design, and is equipped with steam line 13 having therein valve 15. Line 13 contains steam generated by indirect heat exchange with cyclone-type reactor 17. Cyclone-type reactor 17 may be of any suitable conventional design or shape adapted to the rapid dissipation of heat, but is preferably cylindrical in shape with a conical bottom. Water is passed through line 19 and valve 21 to coil 22 surrounding the outer surface of the lower portion of said cyclone-type reactor 17. Water passing through coil 22 extracts heat from the reactor and turns to steam which is removed through line 13 and passed through valve 15 before being supplied to indirect heat exchanger 11. Water is also supplied through line 23 and valve 25 to coil 27 surrounding the outer surface of cyclone separator 29. Cyclone separator 29 is preferably cylindrical in shape with a conical bottom. Water is converted to steam by indirect heat exchange in coil 27 with heat from cyclone separator 29, and passes through line 30 and valve 31 into line 33. Water from line 35 passes through valve 37 into coil 39 located in carbon monoxide burner 41. In coil 39 water is converted to steam, then passed through valve 43 and line 33 to heat exchanger 11. Thus heat exchanger 11 is supplied with steam generated by indirect heat exchange with cyclone reactor 17, cyclone separator 29, and carbon monoxide burner 41. The steam passes through heat exchanger 11 in indirect heat exchange with the carbon passing therethrough in fluid state and leaves through line 45. The steam may be under pressure, such as 250 p. s. i., but this is not necessary. The steam is superheated substantially above 1000° F., preferably to about 1200–2000° F., in order to efficiently heat the carbonaceous feed to at least 1000° F.

The heated feed passes by any suitable means, preferably gravity flow, through line 47 and valve 49 into line 51 where it mixes with substantially pure oxygen in carefully controlled amounts. Oxygen enters the system through line 53 from which it is pumped by compressor 55 into coil 57. Coil 57 surrounds the outer surface of the upper portion of cyclone-type reactor 17. By indirect heat exchange with said cyclone-type reactor 17, the oxygen is heated to at least 1000° F. The heated oxygen passes out of coil 57 through valve 59 and enters line 51 where it commingles with carbonaceous feed entering line 51 through valve 49. The oxygen-feed mixture passes thence into and through valve 63 and nozzle 65. At tip 67 of nozzle 65 the feed-oxygen mixture is subjected to ignition and combustion by any suitable means, such as a pilot flame, spark from a spark plug, carbon arc and the like. Nozzle 65 is situated in the upper portion of reactor 17 at a point below the top thereof.

Reactor 17 may have associated therewith a ceramic, graphite or other type of insulating shield 69 to protect the adjacent metal walls of reactor 17 against the very high conversion temperatures achieved in the area of the nozzle tip. Nozzle 65 may be constructed of any adequate material and be of any suitable design, but is preferably made of graphite, ceramic, or other refractory material, or of steel with a graphite, ceramic or other type of refractory lining. The nozzle or burner 65 incorporates appropriate safety features to prevent combustion from flashing back into the feed supply line. The feed is converted to graphite by combustion of a portion of said feed with the oxygen at the tip 67. The feed burns and generates an intense heat, sufficient to raise the temperature of the unburned portion of said feed to that necessary to convert the carbonaceous feed to graphite. The amount of oxygen present per unit of graphite is closely controlled by means of valve 59 so that there is available only a predetermined portion of oxygen to burn the feed. The amount of feed entering nozzle 65 is carefully controlled by valve 49. Essentially pure oxygen is necessary for the process in order to reach the very high temperatures required for the conversion of the unburned feed to graphite. If diluted oxygen or air is used, heat is expended on a non-contributing portion of the gaseous reactant, i. e., nitrogen, etc., and the necessary 5000–7000° F. conversion temperature cannot be reached. Also, in order to obtain the necessary intimate contact between feed and oxygen and the rapid heat transfer between burning feed and unburned feed essential for production of conversion temperature, the feed must be very finely pulverized down to a mesh size at least as small as 100 mesh. The fluidized feed-oxygen mixture is supplied at a controlled rate to tip 67 where a predetermined portion is burned in the fluidized state and the remaining feed is rapidly converted to graphite. The combustion products, including fluidized finely-divided graphite particles, carbon monoxide and minor amounts of carbon dioxide and sulfur dioxide, issue forth from the combustion zone and, due to the angle at which the nozzle 65 is set in cyclone-type reactor 17, rapidly circulate around the inner periphery of the said cyclone reactor 17. Nozzle 65 is set at an angle to the periphery of cyclone reactor 17 in order to bring about rapid circulation. Rapid cooling takes place due to the rapid dispersion of the combustion products and to the cooling effect of externally disposed steam and oxygen coils 22 and 57, respectively. The major portion of the graphite particles settle to the conical bottom portion of reactor 17 and exit therefrom through valve 71, line 73 and line 75, with the aid of screw conveyor drive 77, into hopper 79.

Combustion gases, comprising mainly carbon monoxide with suspended graphite fines are removed from the top of reactor 17 through valve 81 and line 83 into the upper portion, but below the top, of cyclone separator 29. Graphite fines settle from the combustion gas and pass down to the bottom portion of separator 29, and are removed therefrom through valve 85 and line 87 into hopper 79. During the process of separation of said fines from said combustion gases, cooling of said fines and gases takes place by virtue of the rapid dispersion of the combustion gases in said separator 29 and due to indirect heat exchange with water and steam passing through coil 27.

Cooled combustion gases, principally carbon monoxide, from which the graphite fines have been separated pass out of separator 29 through valve 89 and line 91 into carbon monoxide burner 41, wherein said combustion gases are subjected to burning in the presence of air admitted through line 93 and valve 95 into burner 41. Exhaust gases pass from carbon monoxide burner 41 through valve 97 and line 99 out of the system.

Referring to Figure 2, cyclone-type reactor 17 has steel or other high-melting-point, metallic casing walls and is equipped with graphite shield 69 protecting the wall surface of adjacent burner 65. The burner 65 comprises a graphite tube 101 in which are embedded electrodes 103 having their ends terminating in burner combustion zone 67 to form spark gap 105. Electrical leads 107 supply current to electrodes 103, and line 51 supplies finely powdered coke or other carbonaceous feed admixed with oxygen to combustion zone 67 through graphite channel 109 and interposed safety valve 63 which protects the system from back-flash of feed-oxygen mixture combustion. Burner 65 and shield 69 may be made of material other than graphite, for example, steel or other metal lined with graphite or other refractory material, or wholly of a refractory material such as porcelain, glazed clay, high-temperature, metal-ceramic combination or the like which retains its shape at 5000–7000° F. The graphite shield 69 may extend over all or part of the inner surface of the walls of reactor 17.

In the operation of the process, the following reaction occurs:

2C (from carbonaceous material such as coke) + $O_2$ = 2CO + heat. Thus, an exothermic reaction takes place and carbon monoxide and heat are obtained. The amount of oxygen per unit of feed is carefully controlled, as mentioned above, so that the necessary temperature of 5000–7000° F. is reached with the minimum expenditure of feed as fuel. Substantially pure oxygen is essential to produce the required high temperature. Preheating of the feed and oxygen is employed to speed the reaction and increase the temperatures obtained. The carbon monoxide produced is burned in a subsequent step to furnish heat for use in the preheating step. The graphite produced by the 5000–7000° F. temperature reached by the reaction in the presence of the unburned additional feed is cooled by indirect heat exchange with the heat-exchange medium utilized in the preheating step. Thus, available heat obtained by the reaction is re-utilized to preheat the feed and oxygen. It is, of course, necessary in starting the process of our invention to initially preheat the oxygen and feed by means other than the heat obtained in the process. After the initial preheating operation, the process is continued without the addition of any external source of heat, the heat of combustion being sufficient to preheat the feed and oxygen. The process may be run continuously, intermittently, or as a batch operation.

It has been found that for every 2 pounds of coke charged as feed to the process of our invention not less than about 1.33 pounds of substantially pure oxygen are needed to obtain the required temperature. One pound of coke is converted to carbon monoxide with the release of sufficient heat to raise the reaction mixture to a temperature of 5000–7000° F. and convert the remaining 1 pound of coke to substantially pure graphite in a comparatively short conversion time. The above relative proportions are based on the use of finely ground coke or other carbonaceous feed of at least 100 mesh or smaller, preferably 200 mesh size. When coke of the required small mesh size is used, intimate mixing of oxygen and coke is facilitated and the greater surface area of feed per unit weight allows more rapid combustion and higher total heat generation per unit time. In turn, more rapid transfer of the required heat from burned to unburned coke is achieved and the very high conversion temperatures can be reached. With larger coke particles, conversion temperatures cannot be reached.

The following non-limiting example illustrates the operation of our invention:

Petroleum coke, in an amount of 2 pounds, is charged batchwise to a feed preparation unit and ground therein to 150 mesh size, after which it is subjected to indirect heat exchange with steam in pipes, whereby its temperature is raised to 1000° F. The ground coke is mixed with substantially pure oxygen, also preheated to 1000° F., in a weight ratio of coke to oxygen of 2:1.33. The mixture is continuously passed through a safety valve and into a burner combustion zone where it is ignited by a spark. About 1.0 pound of coke and all the oxygen are consumed to produce 2.33 pounds of carbon monoxide plus enough heat to raise the reaction mixture to 5000° F. Total reaction time in the cyclone reactor is about 10 seconds. A total of 0.9 pound of finely divided graphite cooled to 250° F. is obtained from the bottom portion of the cyclone reactor. About 2.4 pounds of water are used to cool the lower portion of the reactor. Carbon monoxide containing fines cooled to about 1200° F. passes to the cyclone separator, and about 0.1 pound of graphite fines are separated therefrom, to raise the total recovery of graphite to 1 pound. The carbon monoxide is then passed to the carbon monoxide burner where it is burned and the heat used to produce about 5 pounds steam at 250 pounds per square inch pressure. Additional steam is obtained from water used to cool the products in the cyclone separator from about 1200° F. to about 250° F.

A further non-limiting example of the process of our invention is the following:

In a continuous process, petroleum coke is heated to drive off volatile matter and then is ground to 300 mesh size. After being preheated to about 1000° F., the coke is fed to a mixing zone at the rate of 1.5 lbs. per minute and mixed therein with pure oxygen which also has been preheated to about 1500° F. The mixture is passed to the reactor at the rate of 2.83 lbs. per minute and ignited in a graphite nozzle in the cyclone reactor by means of an electric spark. 0.45 pound of graphite per hour produced at 5500° F. is obtained at a temperature of 250° F. from the bottom of the cyclone reactor. An additional amount of 0.05 pound per hour of graphite is obtained from the cyclone separator.

From the above examples and above discussion, it is seen that the process of our invention produces high purity graphite economically and quickly with the utilization of easily obtainable and easily manipulated apparatus. The process is preferably run as a continuous operation, heat produced from the burning of coke being used to preheat the coke and oxygen. The process is simple, is rapid and requires a minimum of procedural steps.

Such modifications or additions of process steps and/or equipment as may be invoked by those skilled in the prior art are within the scope of this invention and are contemplated thereby.

We claim and particularly point out as our invention:

1. A process for preparing graphite which comprises the steps of admixing finely divided solid carbonaceous feed with about 1.33 parts of substantially pure oxygen to 1.2 to 2 parts of carbonaceous feed, the amount of oxygen being sufficient but not substantially in excess of the amount required to raise the temperature of the mixture upon combustion to approximately 5000–7000° F., introducing said admixture to a cyclone-type reaction zone, igniting said admixture, and separating and recovering from the combustion products substantially pure graphite.

2. A process for preparing finely divided graphite which comprises the steps of heating in separate preheating zones substantially pure oxygen and carbonaceous feed of a particle size at least about as small as 100 mesh, mixing said oxygen and said feed in a weight ratio of about 1.33:2.0 in a mixing zone, introducing the resultant mixture into a heat-resistant burner in a cylone-type reactor, igniting said mixture in said heat-resistant burner, separating, cooling and recovering graphite from combustion gases in said reactor, passing said combustion gases to a cyclone separator and recovering graphite fines therefrom on cooling, passing purified combustion gases to a combustion gas burner and recovering heat therefrom, and utilizing said heat for heating said carbonaceous feed-preheating zone.

3. A process in accordance with claim 2 in which said carbonaceous feed is petroleum coke.

4. A process in accordance with claim 3 in which a portion of the heat for said feed is obtained by indirect heat exchange with fluid heating means heated by combustion products in both said cyclone reactor and in said cyclone separator.

5. A continuous process for the preparation of finely divided graphite which comprises the steps of initially preheating finely divided coke in a heat exchanger to at least 1000° F. by indirect heat exchange with steam produced as hereinafter set forth, preheating substantially pure oxygen by indirect heat exchange as hereinafter set forth, mixing said preheated coke with said preheated oxygen in a conduit in the weight ratio of about 1.33 pounds of oxygen per every 2 pounds of coke, passing the mixture into a refractory burner in a steel cyclone reactor having a protective heat-resistant shield surrounding at least a portion of the inner surface thereof adjacent to said burner and igniting said mixture in a combustion zone in said burner, maintaining a temperature of about 5000–7000° F. adjacent to said burner, rapidly circulating resulting combustion gases and finely divided graphite suspended therein through said reactor and simultaneously cooling said graphite and said combustion gases in the upper portion of said reactor by indirect heat exchange with newly introduced oxygen, and in the lower portion of said reactor by indirect heat exchange with water to convert it to superheated steam at a temperature substantially above 1000° F., passing said steam to said heat exchanger for the above-said preheating of newly introduced coke and passing said oxygen to above-said mixing step, collecting and removing graphite from the bottom portion of said reactor, passing said combustion gases to a cyclone separator and therein further cooling said combustion gases by indirect heat exchange with water, recovering cooled graphite fines from said combustion gases, passing steam generated by the above-said heat exchange in said separator to said heat exchanger for preheating newly introduced coke, passing purified cooled combustion gases to a carbon monoxide burner, recovering heat therefrom by indirect heat exchange with water and passing generated steam to said heat exchanger for preheating said newly introduced coke.

6. In a process of preparing graphite by partial combustion of finely divided suspended solid carbonaceous material in an atmosphere of substantially pure oxygen and in which said carbonaceous material and oxygen are preheated prior to combustion, the steps of separating graphite from the combustion gases containing carbon monoxide, subjecting the gases from which graphite has been separated to further combustion in a separate combustion zone and utilizing the heat of combustion generated in said separate combustion zone to preheat said solid carbonaceous material.

7. Process in accordance with claim 6 in which a fluid heating medium is heated by indirect heat exchange with the hot gases in said separate combustion zone and then used to indirectly heat said solid carbonaceous material.

References Cited in the file of this patent

UNITED STATES PATENTS

| | | |
|---|---|---|
| 1,975,259 | Derby | Oct. 2, 1934 |
| 2,257,907 | Griswold | Oct. 7, 1941 |